United States Patent [19]

Föhl

[11] 4,418,878

[45] Dec. 6, 1983

[54] AUTOMATIC ROLL-UP DEVICE FOR SAFETY BELTS

[75] Inventor: Artur Föhl, Schorndorf, Fed. Rep. of Germany

[73] Assignee: REPA Feinstanzwerk GmbH, Alfdorf, Fed. Rep. of Germany

[21] Appl. No.: 299,517

[22] Filed: Sep. 4, 1981

[30] Foreign Application Priority Data

Sep. 8, 1980 [DE] Fed. Rep. of Germany ....... 3033746

[51] Int. Cl.³ ...................... A62B 35/02; B65H 75/48
[52] U.S. Cl. ................................................. 242/107.3

*Primary Examiner*—John M. Jillions

[57] ABSTRACT

Automatic roll-up device for a safety belt having a winding shaft connected to a roll-up spring and to an automatic locking device and carrying a belt web winding roll, the roll-up device also having a belt brake located downstream of the winding shaft in direction of pull of the belt web, the belt brake being in the form of a movable clamping member partly looped around by the belt web and actuatable for clamping the belt web after release of the automatic locking device including a brake roller partly looped around by the belt web and being rotatable in the same direction as the winding shaft, when the belt web is being unrolled and rolled-up,

AUTOMATIC ROLL-UP DEVICE FOR SAFETY BELTS

The invention relates to an automatic roll-up device for a safety belt and, more particularly, to such an automatic roll-up device having a winding shaft connected to a roll-up spring and, to an automatic locking device and carrying a belt web winding roll, the roll-up device also having a belt brake located downstream of the winding shaft in direction of pull of the belt web for unrolling the latter, the belt brake being in the form of a movable clamping member partly looped around by the belt web and actuatable for clamping the belt web after actuation of the automatic locking device.

With a heretofore known roll-up device for safety belts (German Published Prosecuted Application DE-AS No. 14 81 969), a belt drum for storing the belt web in the shape of a belt winding roll, and a clamping device for releasably clamping the belt in any desired withdrawn lengths are disposed within a fitting housing. A gripping device or clamping jaw is after-connected to the belt drum and is partially looped around by the belt web, another clamping jaw fixed to the housing being provided at the level of the looping path at the fitting housing. The swivelable clamping jaw is operatively connected with a spring-loaded locking device, through which, following a belt unrolling in case of a crash, both of the clamping jaws are clamped together and the locking device locks the swivelable clamping jaw, after which no further unrolling of the belt web is possible. This roll-up device is expensive to construct, is difficult to operate and relatively complex with respect to clamping-jaw construction and with respect to assuring a reliable clamping operation.

It is accordingly an object of the invention to provide an automatic roll-up device of the foregoing general type which, in a relatively simple manner constructionally affords a reliable clamping of the belt web, for example, in case of a crush, while especially taking into account a very high-speed clamping reaction after release of the automatic locking device.

With the foregoing and other objects in view, there is provided, in accordance with the invention, an automatic roll-up device for a safety belt having a winding shaft connected to a roll-up spring and to an automatic locking device and carrying a belt web winding roll, the roll-up device also having a belt brake located downstream of the winding shaft in direction of pull of the belt web, the belt brake being in the form of a movable clamping member partly looped around by the belt web and actuatable for clamping the belt web after actuation of the automatic locking device, said clamping member, comprising a brake roller partly looped around by the belt web and being rotatable in the same direction as the winding shaft, when the belt web is being unrolled and rolled-up, the brake roller being movably mounted on a housing for the automatic roll-up device and, upon actuation of locking action by the automatic locking device, being pressable by the belt web in direction of the belt web winding roll clampingly and lockingly against the belt web winding roll, and a spacer member operatively connected with the brake roller and braced against the belt web winding roll, the brake roller being held by the spacer member at substantially constant spacing from the belt web winding roll, in non-locked condition thereof, for every diameter of the belt web winding roll.

Because, in comparison with the initially described conventional device, the brake roller according to the invention, representing the movable brake jaws, under the action of the pull force occurring at the locked belt web, does not merely brake and lock the belt web section being played out but rather the belt web winding roll per se, the difficulties which could potentially occur when there is a clamping between a movable clamping jaw and clamping jaw fixed to a housing, are completely eliminated. Care is accordingly taken that the braking or locking action is effected at the belt web winding roll in exceptionally short time directly after release of the automatic locking device, in that the brake roller follows the diameter of the belt web winding roll which is variable in accordance with the unrolling and rolling-up of the belt web, so that the clamping path to be traveled by the brake roller when activated is always kept very short and constant. In this regard, the spacer member assures a minimal spacing between the outer periphery of the belt web winding roll and between the surface of the brake roller rotating in the same direction, so that no hindrance can occur during normal roll-up and unrolling of the belt web.

In accordance with another feature of the invention, an intermediate roller disposed between the winding shaft and the brake roller and being displaceable with the brake roller in direction of the winding shaft, the housing being formed with elongated guide slots extending radially to the winding shaft and forming a bearing support for the brake roller, the intermediate roller being slidingly supported in the guide slots.

In accordance with a further feature of the invention, the intermediate roller has a smaller diameter than that of the brake roller.

In this case, the spacer member is an intermediate roller which rotates opposite the rotation of the winding shaft of the automatic roll-up device when the belt web is being unrolled or rolled up and, accordingly, offers no hindrance to the roll-up or unrolling operation. On activation, the brake roller, which is partly looped around by the belt web, presses the intermediate roller against the belt web winding roll and instantaneously a high-speed clamping thereof.

In accordance with an added feature of the invention, a spacer member comprises at least one sensor element coupled with the brake roller and displaceable therewith relative to the belt web winding roll, the sensor element projecting a given distance beyond the periphery of the brake roller facing toward the belt web winding roll and being braced against the belt web winding roll, the sensor element being yieldable upon the actuation of locking action.

In accordance with an additional feature of the invention, a sensor element is mounted at both sides of the brake roller and is slidingly displaceable together with the brake roller, a respective spring arm projecting from the sensor element beyond the brake roller.

In accordance with yet another feature of the invention, a freely rotatable sensor roller is mounted on the spring arm.

In accordance with yet a further feature of the invention, a plurality of the sensor elements, each having a guide block formed as a bearing for a roller shaft of the brake roller, the guide block being movably guided relatively to the belt web winding roll in a guide slot formed in the housing.

In the foregoing cases, a sensor element is used, instead of an intermediate roller, as the spacer member and, in a normal case i.e. when the winding shaft is not locked, holds the brake roller at a preset, substantially constant spacing from the outer periphery of the belt web winding roll and, upon activation i.e. when the winding shaft becomes locked, is able to return behind the periphery of the brake roller. The sensor element can thereby have a resiliently yieldable construction, the spring-loading thereof being overcome by the increased pulling force applied to the belt web, or can be formed as a rated breaking member or can be held by a breakable stop in the spacing position when the increased pulling force occurs on the belt web.

In accordance with another feature of the invention, a spring means is applied to both ends of the roller shaft for pressing the brake roller against the belt web winding roll.

The spring force or load ensures a constant intimate connection between the belt web winding roll and the spacer member. Such a springy bracing of the movable part of the clamping device against the belt web winding roll is advantageous for assuring the constant spacing between the clamping roller and the belt web winding roll, although the roll-up spring of the roll-up device connected to the winding shaft ensures contact of the belt web winding roll and the substantially radially displaceable clamping device.

In accordance with yet an added feature of the invention, the brake roller has a roller shaft having at least one double-armed rocker mounted thereon rotatable with respect to the brake roller, the rocker being slidingly displaceable together with the brake roller in a guide slot formed in the housing, the rocker having one rocker arm projecting beyond the brake roller in direction of the belt web winding roll and a sensor element braced against the belt web winding roll, and having another rocker arm guided slidingly on a guide track fixed to the housing and forced by spring loading against the guide track and into the spacer position.

In accordance with yet an additional feature of the invention, a respective rocker at both sides of the brake roller, a freely rotatable sensor roller being mounted between the respective rocker arms of the rockers, the sensor roller being braced against the belt web winding roll in the non-locked condition thereof.

In accordance with another feature of the invention, the sensor roller extends over the entire length of the brake roller.

In accordance with a further feature of the invention, the guide track is of such shape that, for varying diameters of the belt web winding roll, the brake roller is held at constant spacing from the belt web winding roll.

In accordance with an added feature of the invention, the housing is U-shaped and has side walls wherein radial guide slots for slidingly supporting the brake roller and the rockers are formed, the recesses having the substantially radially extending guide tracks being also formed in the side walls behind the guide slots and offset with greater spacing from the belt web winding roll, and including guide elements of the rocker arms facing away from the belt web winding roll projecting into the recesses, the recesses having a width affording a rocking movement of the rockers.

With this embodiment, in an especially simple manner, a possibility is afforded of holding the spacing between the brake roller and the periphery of the belt web winding roll exactly constant in every winding-roll condition by controlling the relative position of the rocker or rockers with respect to the brake roller and the variable peripheral curvature of the belt web winding roll by means of, for example, a curved guide track or path. Through this guide track, the relative position, for example, of a guide roller of the rocker to the belt web winding roll, on the one hand, and to the brake roller, on the other hand, can be varied depending upon or as a function of the respective diameter of the belt web winding roll.

In accordance with a concomitant feature of the invention, the spacer member comprises at least one of a gear and cam take-off coupled, at one side, with the winding shaft and, at the other side with the brake roller in such a manner that the brake roller follows the belt web winding roll of variable diameter at a constant small spacing therefrom.

Other features which are considered as characteristic for the invention are set forth in the appended claims.

Although the invention is illustrated and described herein as embodied in an automatic roll-up device for a safety belt, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 2:
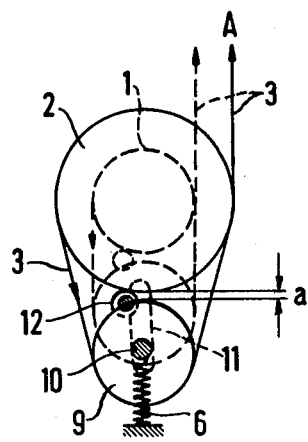
FIG. 2 is a view like that of FIG. 1 of a second embodiment of the automatic roll-up device according to the invention, wherein a sensor element serves as a spacer member.
Figure 3:
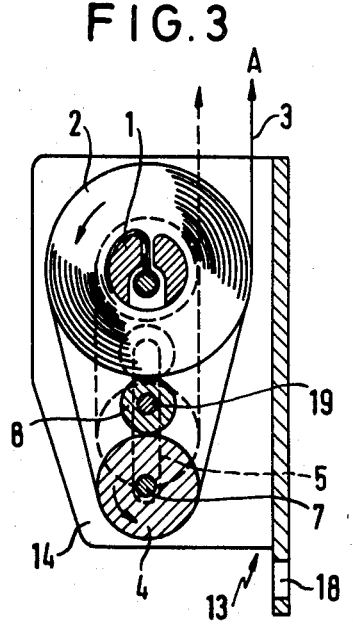
FIGS. 3 and 4 are respective longitudinal sectional and plan views of the embodiment of the automatic roll-up device according to FIG. 1.
Figure 4:
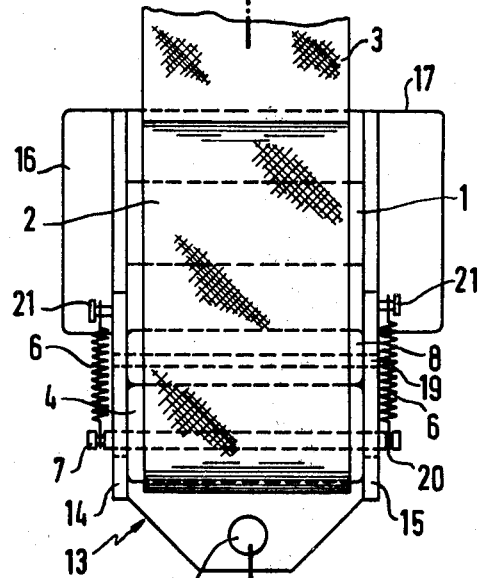
Figure 10:
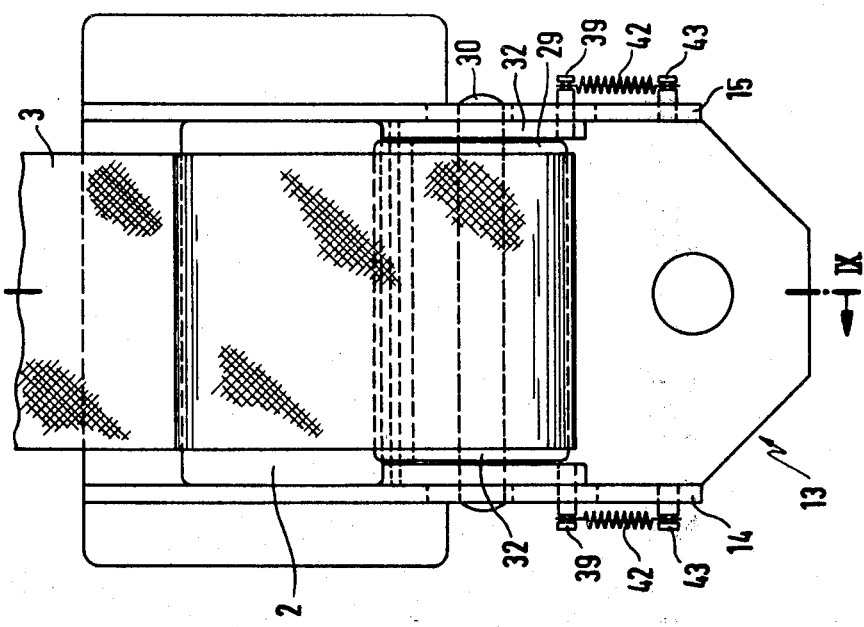
Figure 9:
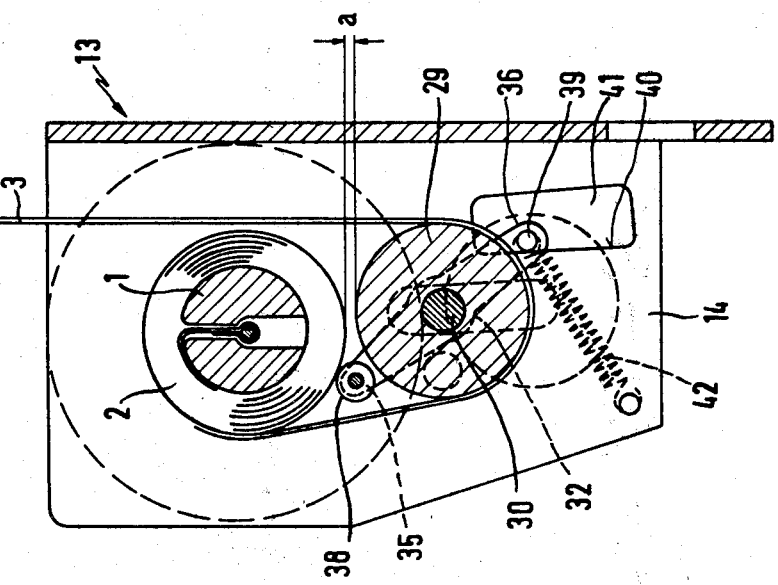
Figure 11:
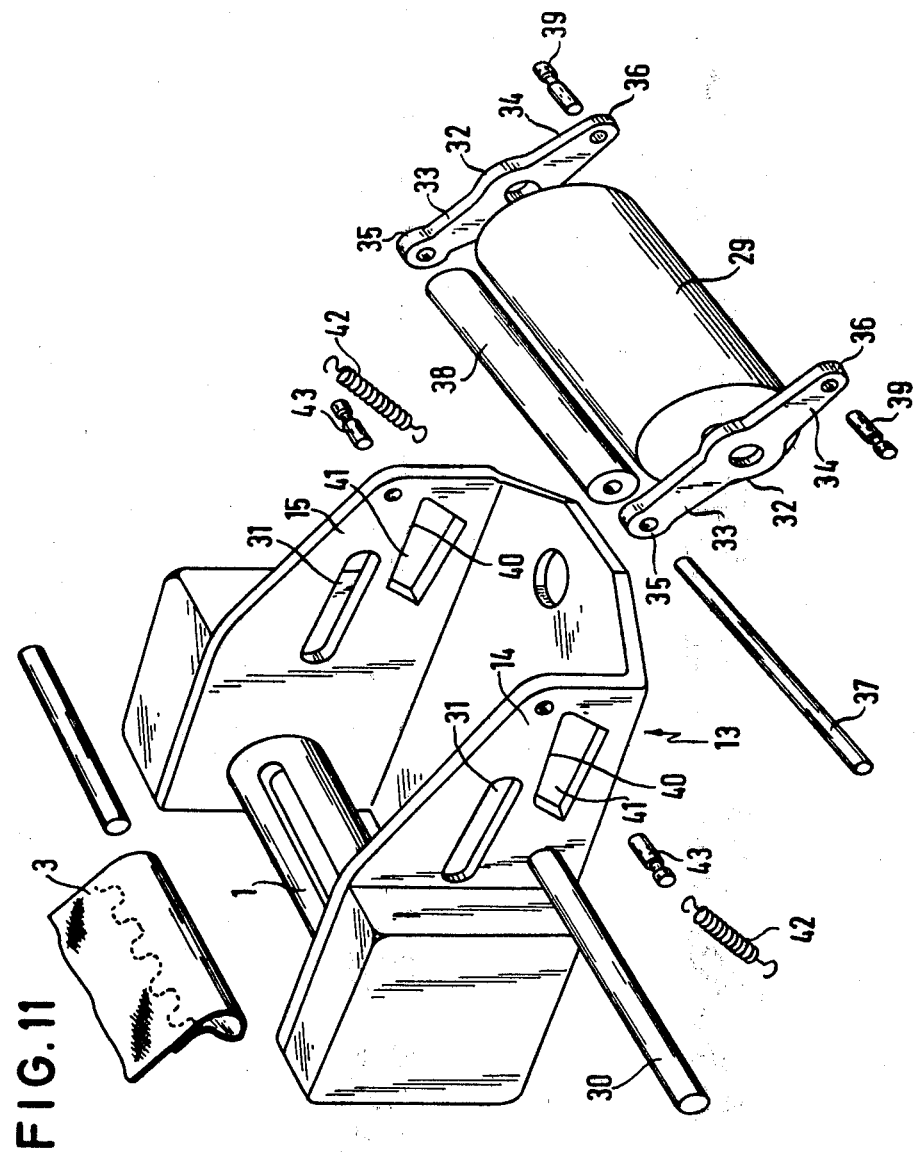

FIGS. 9 and 10 are somewhat enlarged views similar to those of FIGS. 3 and 4, respectively, of an automatic roll-up device according to the invention, which is based in essence upon the principles in FIG. 2; and FIG. 11 is an exploded view of the embodiment of the automatic roll-up device according to FIGS. 9 and 10.

Figure 1:
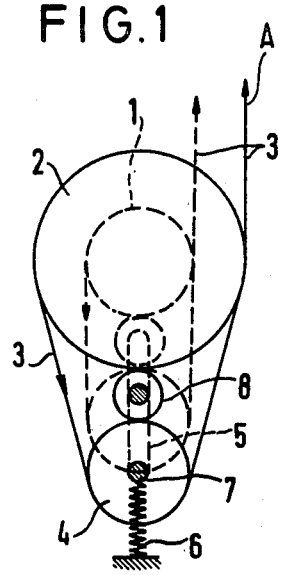
FIG. 1 is a diagrammatic side view of a first exemplified embodiment of the automatic roll-up device according to the invention with an intermediate roller as a spacer member.

Referring now to the drawing and first, particularly, to FIGS. 1 and 2 thereof, there is shown a winding shaft 1 of an otherwise non-illustrated automatic roll-up device, which is rotatably mounted, against the bias of a roll-up spring, in an automatic device housing, a belt winding 2 of a textile belt web 3 being wound on the winding shaft 1.

In the winding condition shown in FIGS. 1 and 2 in solid lines, almost the entire belt web 3 is rolled up on the winding shaft 1, so that the belt winding roll 2 has a maximum diameter. By contrast, a minimum belt winding roll diameter as well as the guidance of belt web 3 are shown by broken lines in this at least approximately fully unrolled winding position. Arrows on the belt web 3 indicate the direction in which the belt web 3 is withdrawn from the belt winding roll 2.

In the exemplified embodiment according to FIG. 1, a cylindrical braking roller 4 is slidingly movably mounted with spacing beneath the belt winding roll 2 in a guide slot 5 which extends radially to the winding shaft 1. The braking roller 4 is pressed against the belt winding roll 2 by a compression spring 6 which engages a roller shaft 7. An intermediate roller 8 between the braking roller 4 and the belt winding roll 2 is likewise slidingly displaceably mounted in the aforementioned guide slot 5, and is, on the one hand braced against the braking roller 4 and, on the other hand, braced against the outer periphery of the belt winding roll 2. The brake roller 4 is partially looped around by the belt web 3 and, during unrolling and roll-up of the belt web 3, is entrained rotatably in the same rotary direction with the winding shaft 1. By means of the intermediate roller 8, the brake roller 4 rotating in the same direction is kept spaced from the belt winding roll 2, rotating in the same direction so that direct contact between the aforementioned parts and, accordingly, a restraint of the roll-up or unrolling movements cannot occur.

The spacer member used therewith is the intermediate roller 8 which, during movement by the belt web 3, rotates in a direction opposite to that of belt winding roll 2, whereby frictional or restraining forces occur between these two parts. Because of the tension or pull on the belt web 3 constantly exerted by the roll-up spring and the pressure or compression spring 6, respectively, the brake roller 4 and the intermediate roller 8 are continuously forced in direction of the winding shaft 1, so that the aforementioned rollers follow every variation in the diameter of the belt winding roll 2. By the broken-line representation, the brake roller 4 and the intermediate roller 8 are shown in the winding position wherein the belt winding roll 2 has the smallest diameter i.e. wherein the belt web 3 is almost completely unrolled from the winding shaft 2. With the occurrence of increased pulling forces on the belt web 3 in direction of the arrow A i.e. if the automatic lock (not shown in FIGS. 1 and 2) of the automatic roll-up device is activated and locks the winding shaft 1, for example, in case of a car crash, the contact pressure of the roller pair 4/8 against the belt winding roll 2 is so intensified by the increased withdrawal of the belt web 3 in direction of the arrow A that, due to the so-called film spool effect, the belt winding roll 2 becomes jammed and stops any further withdrawal of the belt web 3. In this way, the aforedescribed clamping device takes over, at least partially, the function of the locking parts in automatic locks. With the relief of the belt web 3, the high contact pressure is nullified, the automatic roll-up device is automatically released, and the entire system returns to its free-floating state, so that again normal roll-up and unrolling movements of the belt web 3 can be performed.

According to the principle of the embodiment of FIG. 2, likewise a brake roller 9 having a roller shaft 10 slidingly displaceable in a guide slot 11 disposed radially to the winding shaft 1 is mounted so as to be slidingly displaceable in direction of the beltwinding roll 2 whereby here also the brake roller 9 is forced against the belt winding roll 2 by a pressure or compression spring 6. With this principle, the spacer part is formed by a sensor element generally identified by reference numeral 12 which, under spring preloading, projects beyond the outer periphery of the brake roller 9 and is directly braced against the belt winding roll 2. With normal actuation of the automatic roll-up device i.e. for a normal pull exerted on the belt web 3, the sensor element 12 holds the brake roller at a distance a from the respective belt winding roll periphery, whereby here, too, the functional unit of brake roller 9/sensor element 12 can follow every change in diameter of the belt winding roll 2, as is indicated by the broken lines. With the occurrence of increased pulling force on the belt web 3 e.g. in case of a crash, the spacer force and the spring load of the sensor element 12, respectively, is overcome, and the brake roller 9 is forced with increased pressure against the belt winding roll 2, clamping and locking the latter. The manner of operation thereof is the same as for the embodying principle according to FIG. 1. In contrast therewith, for normal actuation of the automatic roll-up device, the roll-up and unrolling movement of the belt winding roll 2 is in no way impaired or hampered by the substantially constant spacing a. When the system is relieved, the sensor element is located again beyond the outer periphery of the brake roller 9, with which the spacing a and the free-floating state of the system is re-established.

Figure 5:
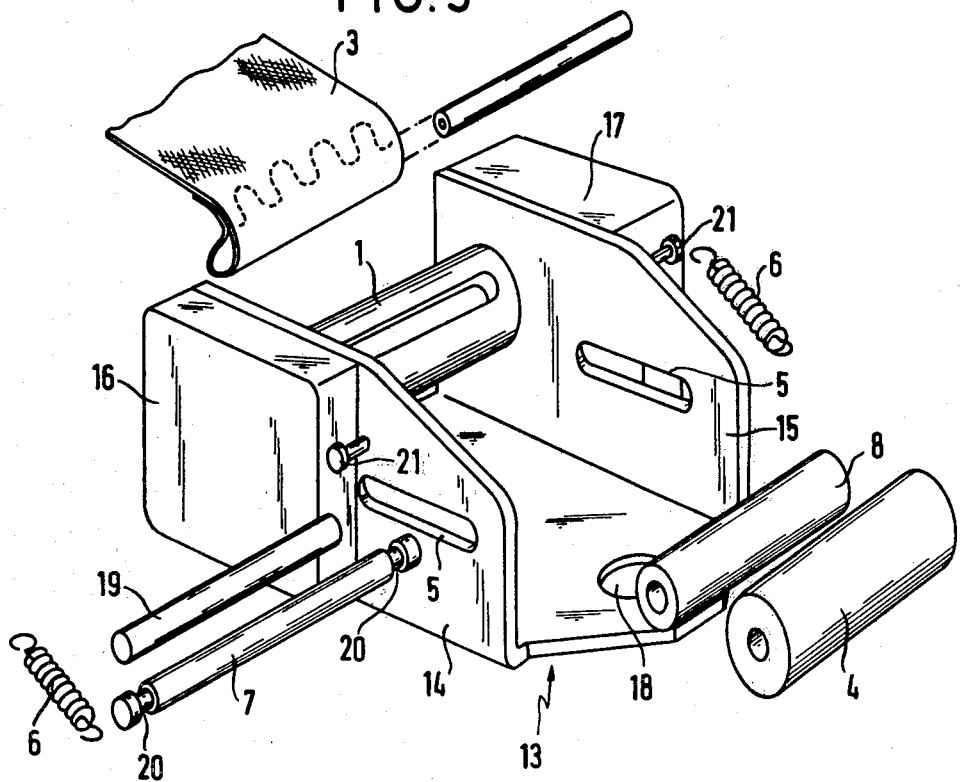
FIG. 5 is an exploded view of the embodiment of the automatic roll-up device according to FIGS. 3 and 4.

FIGS. 3 through 5 show a practical embodiment of the principles of construction according to FIG. 1. A V-shaped automatic-device housing 13 is provided, between freely standing side walls 14 and 15 of which, the winding shaft 1 is rotatably mounted. The free end of the belt web 3 is locked to this winding shaft 1. The winding shaft 1 is connected, on one side, to an otherwise non-illustrated roll-up spring ensuring roll-up of the belt web 3 and disposed within a covering 16. At the outside of the other side wall 15, a conventional automatic locking device is likewise disposed within a covering 17 and is in the form, for example, of lock toothing or locking ratchet on the winding shaft 1 with a pawl or catch actuatable by an automatic release system, such as an inertial mass, for example. Actuation is effected when an increased pulling force is exerted on the belt web 3, for example, in case of a crash, whereupon the winding shaft 1 locks instantaneously. By means of a bore 18 formed in the base-plate of the automatic-device housing 13, the automatic roll-up device can be fastened, for example, to a frame beam of a motor vehicle. The brake roller 4 is slidingly displaceably mounted by means of the roller shaft 7 in the guide slots 5 formed in the side walls 14 and 15, while the intermediate roller 8 is freely rotatably mounted on a bearing pin 19 likewise in the guide slots 5. At the ends of the roller shaft 10 projecting beyond the side walls 14 and 15, recesses or cut-outs 20 are formed wherein a tension spring 6 is suspended which is mounted, on the other hand, on the pin 21 fixed to the housing. By means of this spring 6, the combination brake roller 4/intermediate roller 8 is continuously forced against the belt winding roll 2 with a predetermined slight pressure, so that the aforementioned combination is able to follow every change in diameter of the belt winding roll 2, for example into the winding position with the most minimal belt winding roll diameter indicated by broken lines in the brake roller 4 and the intermediate roller 8 of FIGS. 3 and 4. The operation of the aforedescribed device has been previously explained with reference to FIG. 1.

Figure 6:
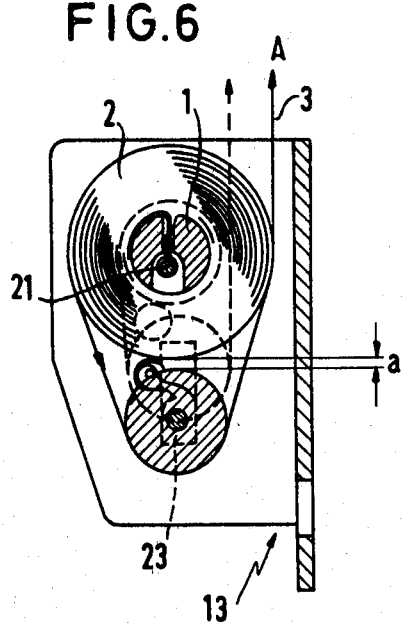
FIGS. 6 and 7 are views like those of FIGS. 3 and 4, respectively, of the embodiment of the automatic roll-up device according to FIG. 2.
Figure 7:
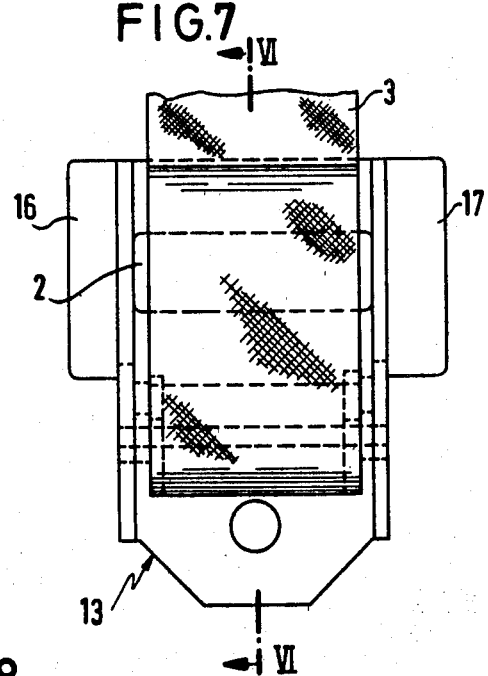
Figure 8:
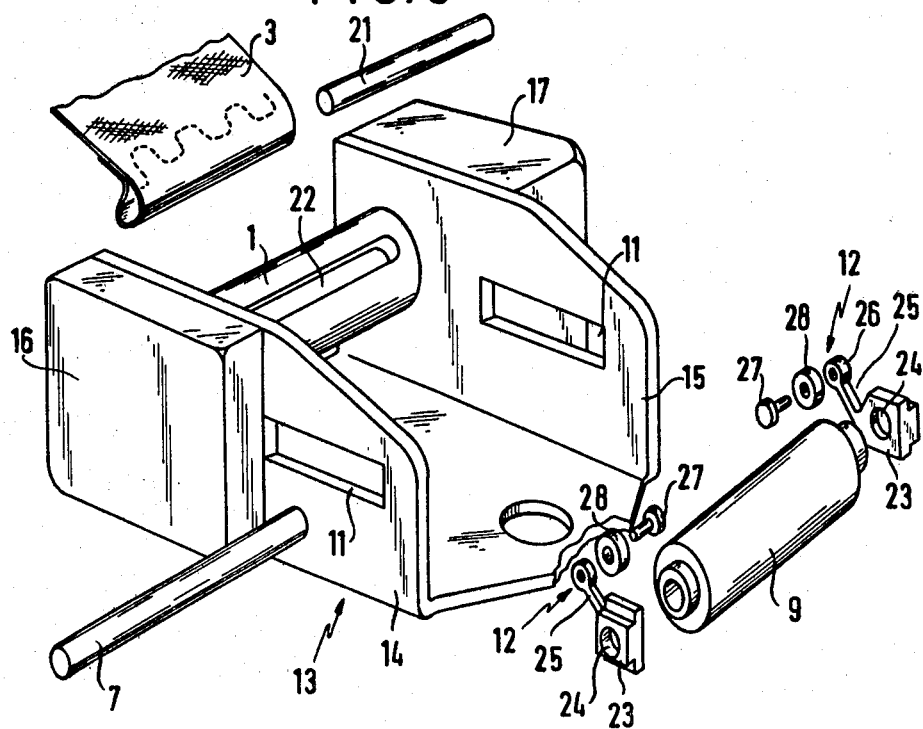
FIG. 8 is an exploded view of the embodiment of the automatic roll-up device according to FIGS. 6 and 7.

FIGS. 6 to 8 show an exemplary embodiment of the principle diagrammatically illustrated in FIG. 2. In this embodiment also, an automatic-device housing 13 is used having side walls 14 and 15 with a winding shaft 1, a roll-up spring and automatic locking device, covered by coverings 16 and 17. In this embodiment also, the loop-shaped belt web end is provided with a pin 21 and locked in a slot 22 of the winding shaft 1. Two substantially rectangular guide blocks or shoes 23 are slidingly displaceably guided in guide slots 11 formed in the side walls 14 and 15 and extending substantially radially to the winding shaft 1. The guide blocks 23 are formed with bearing bores 24 in which the roller shaft 7 is freely rotatably mounted. The brake roller 9, in turn, is freely rotatably mounted on the roller shaft 7. Spring arms 25 of relatively thin cross section are formed or attached to the guide blocks 23, project with beefed-up bearing parts 26 beyond the outer periphery of the brake roller 9, freely rotatable sensor rollers 28 being mounted by means of bearing pins 27 at the bearing parts 26. The sensor rollers 28 form the sensor elements 12 shown in FIG. 2, which are directly braced against the outer periphery of the belt winding roll 2, and hold the brake roller 9 at a spacing a from the periphery of the belt winding roll 2. These sensor elements assure that, during roll-up and unrolling of the belt web 3, a substantially constant spacing a will be maintained, so that, for normal actuation or operation of automatic roll-up device, contact between the brake roller 9 and the belt winding roll 2 does not occur. When the system is activated, the spring force of the spring arms 25 is overcome by the withdrawal of the belt web 3, and the brake roller 9 comes into direct contact with the belt winding roll 2 and brakes the latter in the direction A in accordance with the increasing withdrawal force. Also, in this embodiment, due to the fact that, for every diameter of the belt winding roll 2, the spacing between the brake roller 9 and the belt winding roll 2 is held substantially constant, the clamping path of the brake roller 9 and, accordingly, the clamping time, is exceptionally short. After the increased tensile or pulling force on the belt web 3 has been slackened, the brake roller 9 is again forced by the spring arms 25 into the normal position with the spacing a.

Also in the exemplary embodiment according to FIGS. 9 through 11, a U-shaped automatic-device housing 13 with side walls 14 and 15 is provided, between which the winding shaft 1 with the belt web 3 is rotatably mounted against the bias of the roll-up spring, and is connected with the aforedescribed automatic locking device. A cylindrical brake roller 29 is slidingly displaceably mounted by means of a roller shaft 30 in elongated guide slots 31 extending radially to the winding shaft 1. Likewise, on the roller shaft 30, between the end faces of the brake roller 29 and the inner sides of the side walls 14 and 15, two rockers 32 are freely rotatably mounted, each of the rockers 32 being constructed in the shape of a double-armed lever having two diametrically opposing rocker arms 33 and 34. Both rocker arms 33 and 34 are of such length that respective bearing locations 35 and 36 thereof project beyond the outer periphery of the brake roller 29. On the bearing locations 35 of the rocker arms 33 at the belt winding-roll side, an elongated sensor roller 38 extending over the entire length of the brake roller 29 is freely rotatably mounted by means of a bearing pin 37 between both rockers 32, while outwardly directed stop pins 39 are fastened to the oppositely disposed bearing locations 36. The stop pins 39 are guided on a guide path or track 40 formed by recesses 41 in the side walls 14 and 15. These recesses 41, in the exemplary embodiment of FIG. 11, are offset with a greater spacing from the belt winding roll 2 behind the guide slots 31, the guide tracks or paths 40 extending substantially radially to the winding shaft 1. Tension springs 42 are suspended at notches or incisions of stop pins projecting outwardly from the side walls 14 and 15, and are fastened with pre-loading to the pins 43 at the housing side thereof. Through the force of the tension springs 42, the stop pins 39 are pressed against the guide tracks 40, so that the sensor rollers 38 come to the holding or spacing positions shown in FIGS. 9 and 10 and are directly braced against the belt winding roll 2 and, accordingly, hold the brake roller 29 at a spacing a from the outer periphery of the belt winding roll 2. Through suitable, for example, curved construction of the guide tracks 40, the rockers 32, for example with reduced belt winding roll-diameter, are guided in direction toward the junction or connecting line between the winding shaft 1 and the roller shaft 30, so that, for every winding roll-diameter, exactly the same spacing a is always maintained. Upon the application of an increased pulling force in direction A to the belt web 3, the force of the springs 42 is overcome, and the brake roller 29 comes into direct contact with the belt winding roll 2, so that the latter is clamped again. In order to permit a swiveling movement of the rockers 32, the width or breadth of the recesses 41 are selected so that the stop pins 39 can perform the swiveling movements thereof unhindered. After the increased pulling force on the belt web 3 has been slackened, the spring loading of the tension spring 42 reasserts itself, and the rockers 32 return to the holding or spacing positions shown in FIGS. 9 and 10. In FIG. 9, the brake roller 29 shown in solid lines is represented in the winding position having the smallest winding-roll diameter, while the position thereof having the largest winding-roll diameter is indicated by broken lines.

There are claimed:

1. Automatic roll-up device for a safety belt having a winding shaft connected to a roll-up spring and to an automatic locking device and carrying a belt wed winding roll, the roll-up device also having a belt brake located downstream of the winding shaft in direction of pull of the belt web, the belt brake being in the form of a movable clamping member partly looped around by the belt web and actuatable for clamping the belt web after actuation of the automatic locking device, said clamping member comprising a brake roller partly looped around by the belt web and being rotatable in the same direction as the winding shaft, when the belt web is being unrolled and rolled-up, a housing for the automatic roll-up device on which said brake roller is movably mounted and, upon actuation of locking action by the automatic locking device, being pressable by the belt web in direction of the belt web winding roll to effect clamping and locking of the belt web winding roll, and a spacer member operatively connected with said brake roller and braced against the belt web winding roll, said brake roller being held by said spacer member at substantially constant spacing from the belt web winding roll, in non-locked condition thereof, for every diameter of the belt web winding roll.

2. Automatic roll-up device according to claim 1 including an intermediate roller disposed between the winding shaft and said brake roller and being displaceable with said brake roller in the direction of the winding shaft, the housing being formed with elongated guide slots extending radially to the winding shaft and forming a bearing support for said brake roller, said intermediate roller being slidingly supported in said guide slots.

3. Automatic roll-up device according to claim 2 wherein said intermediate roller has a smaller diameter than that of said brake roller.

4. Automatic roll-up device according to claim 1 wherein said spacer member comprises at least one sensor element coupled with said brake roller and displaceable therewith relative to the belt web winding roll, said sensor element projecting a given distance beyond the periphery of said brake roller facing toward the belt web winding roll and being braced against the belt web winding roll, said sensor element being yieldable upon said actuation of locking action.

5. Automatic roll-up device according to claim 4, including guide blocks mounted at both sides of said brake roller, said guide blocks fixed against rotation yet slidingly displaceable together with said brake roller, a spring arm at each said side connecting said guide blocks to said sensor element and providing a resiliently yieldable construction.

6. Automatic roll-up device according to claim 5 wherein said sensor element is a freely rotatable sensor roller mounted on said spring arm.

7. Automatic roll-up device according to claim 5 wherein a roller shaft is provided for said brake roller, wherein each guide block is formed as a bearing for said roller shaft of said brake roller, wherein a guide slot for said guide block is formed in said housing, said guide block being movably guided relatively to the belt web winding roll in said guide slot formed in said housing.

8. Automatic roll-up device according to claim 7 including spring means applied to both ends of said roller shaft for pressing said brake roller against the belt web winding roll.

9. Automatic roll-up device according to claim 4 wherein a roller shaft is provided for said brake roller, said roller shaft having at least one double-armed rocker mounted thereon rotatable with respect to said brake roller, said rocker being slidingly displaceable together with said brake roller in a guide slot formed in the housing, said rocker having one rocker arm projecting beyond said brake roller in direction of the belt web winding roll and the sensor element supported by said one rocker arm braced against the belt web winding roll, and having another rocker arm guided slidingly on a guide track fixed to said housing and forced by spring loading against said guide track and holding the brake roller at substantially constant spacing from the belt web winding roll.

10. Automatic roll-up device according to claim 9 including a respective rocker at both sides of said brake roller, and wherein the sensor element is a freely rotatable sensor roller mounted between the respective rocker arms of the rockers, said sensor roller being braced against the belt web winding roll in said non-locked condition thereof.

11. Automatic roll-up device according to claim 10 wherein said sensor roller extends over the entire length of said brake roller.

12. Automatic roll-up device according to claim 9 wherein said guide track is of such shape that, for varying diameters of the belt web winding roll, said brake roller is held at constant spacing from the belt web winding roll.

13. Automatic roll-up device according to claim 9 wherein said housing is U-shaped and has side walls, wherein two said rockers are mounted on said roller shaft, wherein one said radial guide slot is formed in each said side wall for slidingly supporting said brake roller and said rockers, wherein recesses having said substantially radially extending guide tracks are also formed in said side walls behind said guide slots and offset with greater spacing from the belt web winding roll, and including guide elements of the rocker arms facing away from the belt web winding roll projecting into said recesses, said recesses having a width affording a rocking movement of said rockers.

* * * * *